US006320958B1

(12) United States Patent
Sekine

(10) Patent No.: US 6,320,958 B1
(45) Date of Patent: *Nov. 20, 2001

(54) REMOTE CONFERENCE SYSTEM USING MULTICAST TRANSMISSION FOR PERFORMING ECHO CANCELLATION

(75) Inventor: Akihiro Sekine, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/968,582

(22) Filed: Nov. 13, 1997

(30) Foreign Application Priority Data

Nov. 26, 1996 (JP) .................................... 8-314721

(51) Int. Cl.[7] ...................................... H04M 1/00
(52) U.S. Cl. ................... 379/406.01; 379/202; 370/286; 348/14.09
(58) Field of Search ..................................... 379/202, 410, 379/93.01, 93.21, 411; 348/14–15; 370/260–269, 286–292, 230–231; 365/230.02

(56) References Cited

U.S. PATENT DOCUMENTS

| 4,825,433 | * | 4/1989 | Deschaine ............................. 370/62 |
| 5,379,280 | * | 1/1995 | Cotton et al. ......................... 370/62 |
| 5,436,896 | * | 7/1995 | Anderson et al. .............. 365/230.02 |
| 5,940,479 | * | 8/1999 | Guy et al. ......................... 379/93.01 |
| 6,118,763 | * | 9/2000 | Trumbull ............................. 370/231 |

* cited by examiner

Primary Examiner—Curtis Kuntz
Assistant Examiner—George Eng
(74) Attorney, Agent, or Firm—Foley & Lardner

(57) ABSTRACT

In a remote conference system based on a client server model, each of conference terminals comprises a terminal packet memory for storing a voice data of the conference terminal. When a synthesized voice data is multicasted to the conference terminals, each of the conference terminals searches own voice data included in the synthesized voice data from the terminal packet memory. An echo canceler in each of the conference terminals cancels own voice data from the synthesized voice data, thereby performing an echo canceling processing.

6 Claims, 6 Drawing Sheets

| IDENTIFIER $ID_i$ | SEQUETIAL No. $SEQ_j$ | TERMINAL VOICE DATA $DT_{ij}$ |
|---|---|---|

FIG.4

| $ID_1$ | $SEQ_4$ | $ID_2$ | $SEQ_3$ | $ID_3$ | $SEQ_3$ | SYNTHESIZED VOICE DATA $DTM_k$ |
|---|---|---|---|---|---|---|

FIG.5

REMOTE CONFERENCE SYSTEM USING MULTICAST TRANSMISSION FOR PERFORMING ECHO CANCELLATION

BACKGROUND OF THE INVENTION

The present invention relates to a remote conference system, and more particularly to a remote conference system which transmits voice data using multicast in a server client model.

In a conventional remote conference system, each of conference terminals and a conference controller are mutually connected. Each conference terminal transmits voice data to the conference controller. The conference controller synthesizes the voice data transmitted from each of the conference terminals, and transmits the synthesized voice data to each of the conference terminals. At the time of synthesizing the voice data, the conference controller performs echo canceling processing in order to prevent echo (e.g., howling) in each of the conference terminals.

The echo canceling processing is the one in which the voice data already transmitted from a certain conference terminal is canceled from voice data to be transmitted to that conference terminal. For example, assuming that voice data from a conference terminal A be "a", voice data from a conference terminal B be "b", and voice data from a conference terminal C be "c", voice data (b+c) is transmitted to the conference terminal A, voice data (c+a) is transmitted to the conference terminal B, and voice data (a+b) is transmitted to the conference terminal C.

In the conventional remote conference system, since the different voice data are transmitted from the conference controller to the conference terminals, the conference controller must synthesize the voice data for each conference terminal one by one. In addition, the conference controller must transmit each of the voice data one by one (i.e., unicast transmission). Therefore, loads for processing in the conference controller increase and traffics on networks increase, resulting in an increase in data delay.

SUMMARY OF THE INVENTION

In view of the foregoing problem of the conventional system, an object of the present invention is to provide a remote conference system which averages the processing load over the whole of the system and suppresses the traffics on the network while possessing an echo canceling function.

In one preferable embodiment of the present invention, one conference terminal cancels its own voice data from a synthesized voice data which is obtained by synthesizing voice data produced by all of other conference terminals.

With the unique and unobvious structure of the present invention, the terminal voice data causing the echo is canceled from the synthesized voice data transmitted by a multicast transmission.

BRIEF DESCRIPTION OF THE DRAWINGS

The above-mentioned and other objects, features and advantages of this invention will become more apparent by reference to the following detailed description of the invention taken in conjunction with the accompanying drawings in which:

FIG. 4 is a format of a terminal packet generated by a terminal packet generator 130;

FIG. 5 is a format of a synthesized packet synthesized by a synthesizer 220;

DETAILED DESCRIPTION OF THE PREFERRED EMBODIMENT

A remote conference system in accordance with a preferred embodiment of the present invention will be described in detail with reference to the accompanying drawings.

Figure 1:
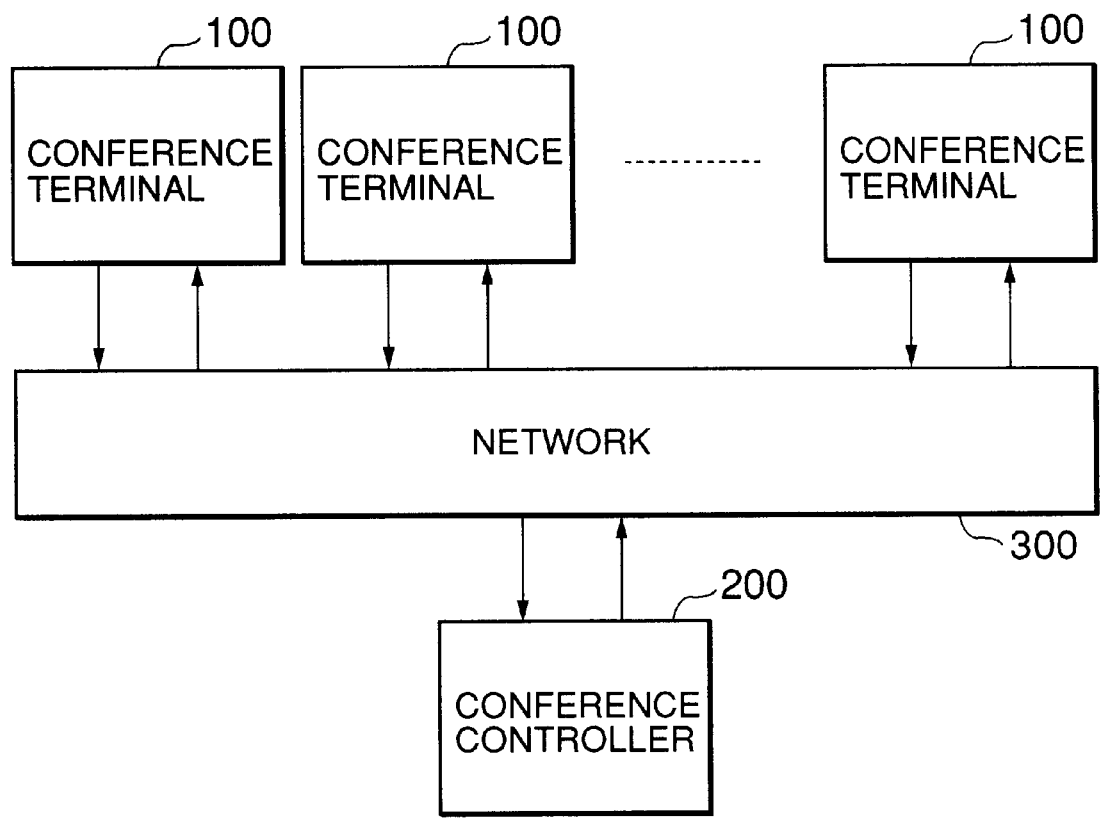
FIG. 1 is a block diagram showing an entire configuration of a remote conference system of the present invention.

Referring to FIG. 1, in a remote conference system of the present invention, a plurality of conference terminals 100 as clients are coupled to a conference controller 200 as a server via a network 300. Each of the conference terminals 100 transmits the voice data as a terminal packet to the conference controller 200. The conference controller 200 synthesizes the terminal packets received from the conference terminals 100, and transmits the synthesizing results as the synthesized terminal packets to the conference terminals 100.

The network 300 preferably has a function multicasting the synthesized packets from the conference controller 200 to the conference terminals 100. The network 300 performs the multicasting using, for example, UDP (User Datagram Protocol) as the fourth layer protocol and ATM (Asynchronous Transfer Mode) as the second layer protocol. That is, the multicasting may be realized using any layer. It should be noted that since the packets to be transmitted to the conference terminals are the same, a network having no multicasting function can transmit the packets by the form of an unicasting.

Figure 2:
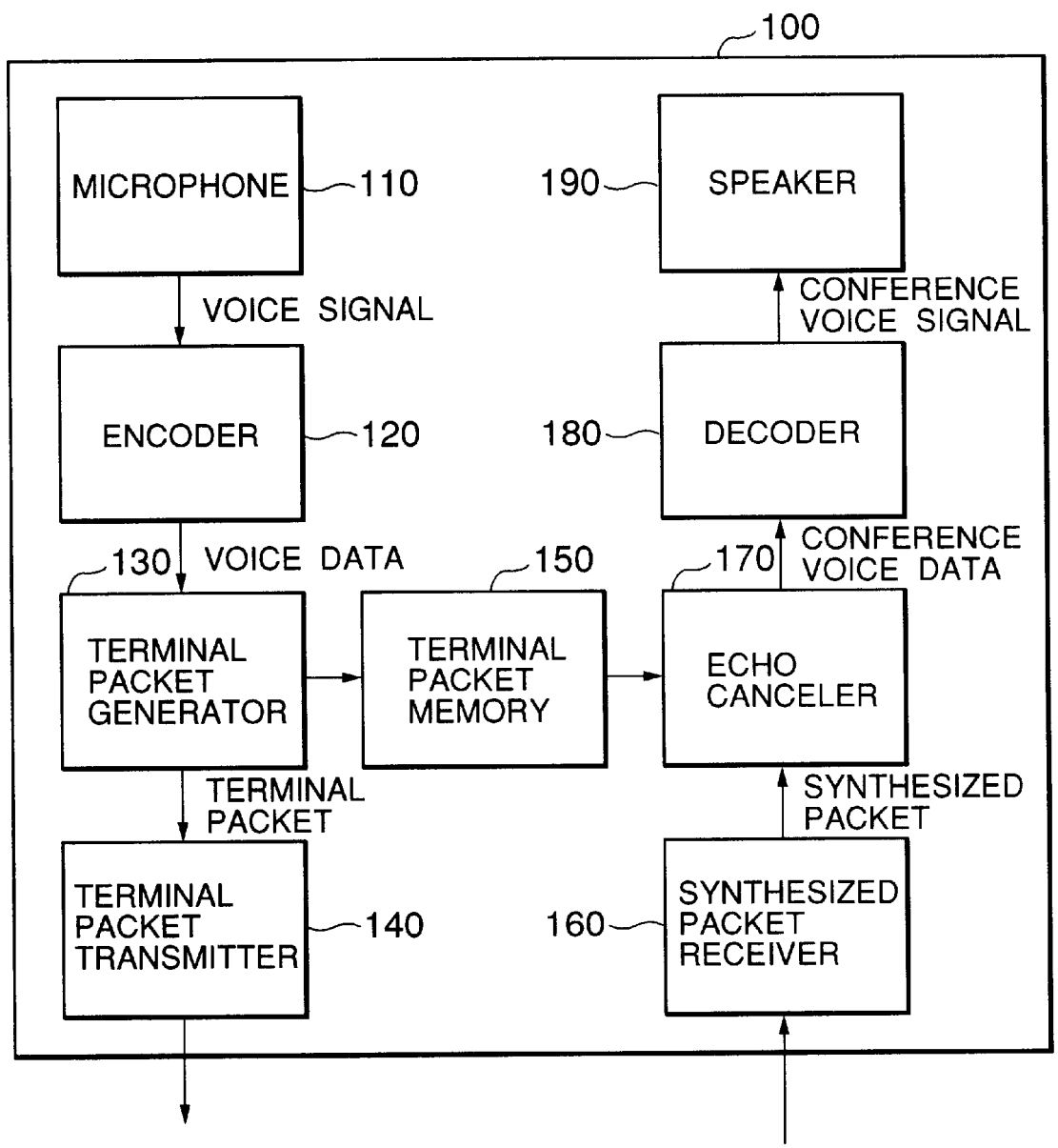
FIG. 2 is a block diagram showing a configuration of a conference terminal 100 in the present invention.

Referring to FIG. 2, each of the conference terminals 100 comprises a microphone 110, an encoder 120, a terminal packet generator 130, a terminal packet transmitter 140, a terminal packet memory 150, a synthesized packet receiver 160, an echo canceler 170, a decoder 180 and a speaker 190.

The microphone 110 collects a voice sound having more than noise level, and converts the voice sound to a voice signal. The microphone 110 outputs the electronic signal to the encoder 120.

The encoder 120 encodes the voice signal from the microphone 110. As a coding system, for example, a PCM (Pulse Code Modulation) encoding system and an MPEG (Motion Picture Expert Group) audio encoding system are adopted. The PCM encoding system is performed in such manner that voice waveforms are sampled depending on a time axis and the sampled voice waveforms are quantized. The MPEG audio encoding system is performed in such manner that the voice waveforms are sampled depending on a frequency axis every sub-band and the voice waveforms are quantized. The encoder 120 outputs the encoded voice signal as the voice data, to the terminal packet generator 130.

The terminal packet generator 130 appends terminal identifiers and serial numbers to the voice data from the encoder 120 in order to generate terminal packets. Each of the terminal identifiers is the one that is for identifying the corresponding one of the conference terminals. When "m" conference terminals are present, each of the terminal identifiers is expressed as "$ID_i$" (i=1 to m). The serial number is a number, generated for each conference terminal, that is for identifying the voice data in each conference terminal. When n-series voice data are present, the serial numbers are expressed as "$SEQ_j$" (j=1 to n). Each of the voice data "$DT_{ij}$" is identified in the system by the corresponding one of the terminal identifiers and serial numbers. Specifically, the terminal packets generated by the terminal packet generator 130 are illustrated as FIG. 4.

The terminal packet transmitter 140 transmits the terminal packet generated by the terminal packet generator 130 to the network 300 according to the specified procedures.

Figure 6:
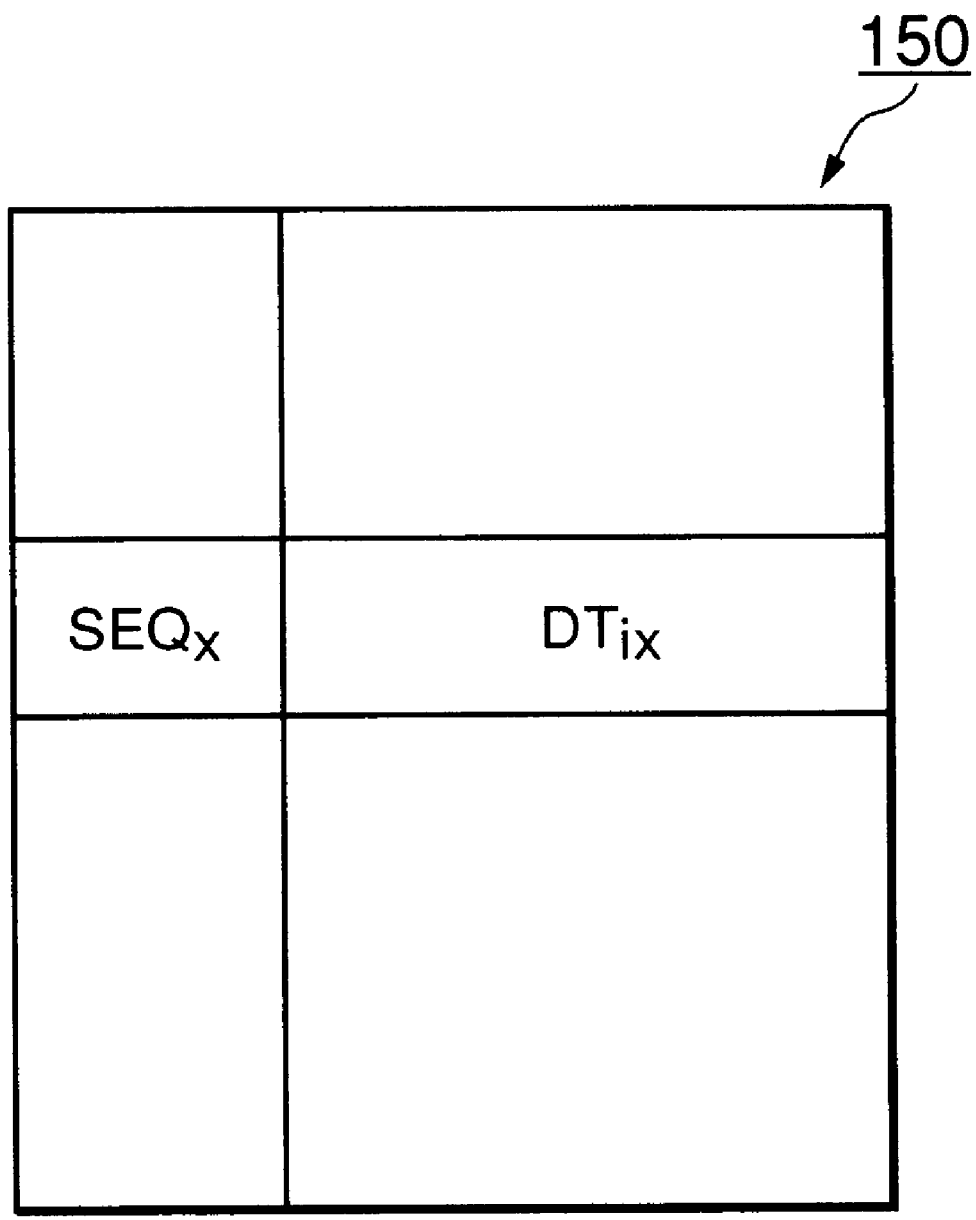
FIG. 6 is a diagram showing a configuration of a terminal packet memory 150.

The terminal packet memory 150 stores the terminal packets generated by the terminal packet generator 130. It should be noted that since each of the terminal packets stored in the terminal packet memory 150 is the one generated in the corresponding one of the conference terminals, the terminal identifiers in the terminal packets need not be stored therein. Therefore, the terminal packet memory 150 has configuration as in FIG. 6.

The synthesized packet receiver 160 receives the synthesized packet from the conference controller 200 through the network 300. The synthesized packet receiver 160 outputs the synthesized packet to the echo canceler 170.

The echo canceler 170 cancels (e.g., erases) the terminal voice data in the terminal packets stored in the terminal packet memory 150 from the synthesized voice data in the synthesized packets which has been received by the synthesized packet receiver 160. The echo canceler 170 outputs a data after the cancellation as a conference voice data.

The decoder 180 decodes the conference voice data from the echo canceler 170, and outputs the decoded conference voice data as a conference voice signal to the speaker 190.

The speaker 190 sounds the conference voice signal from the decoder 180.

Figure 3:
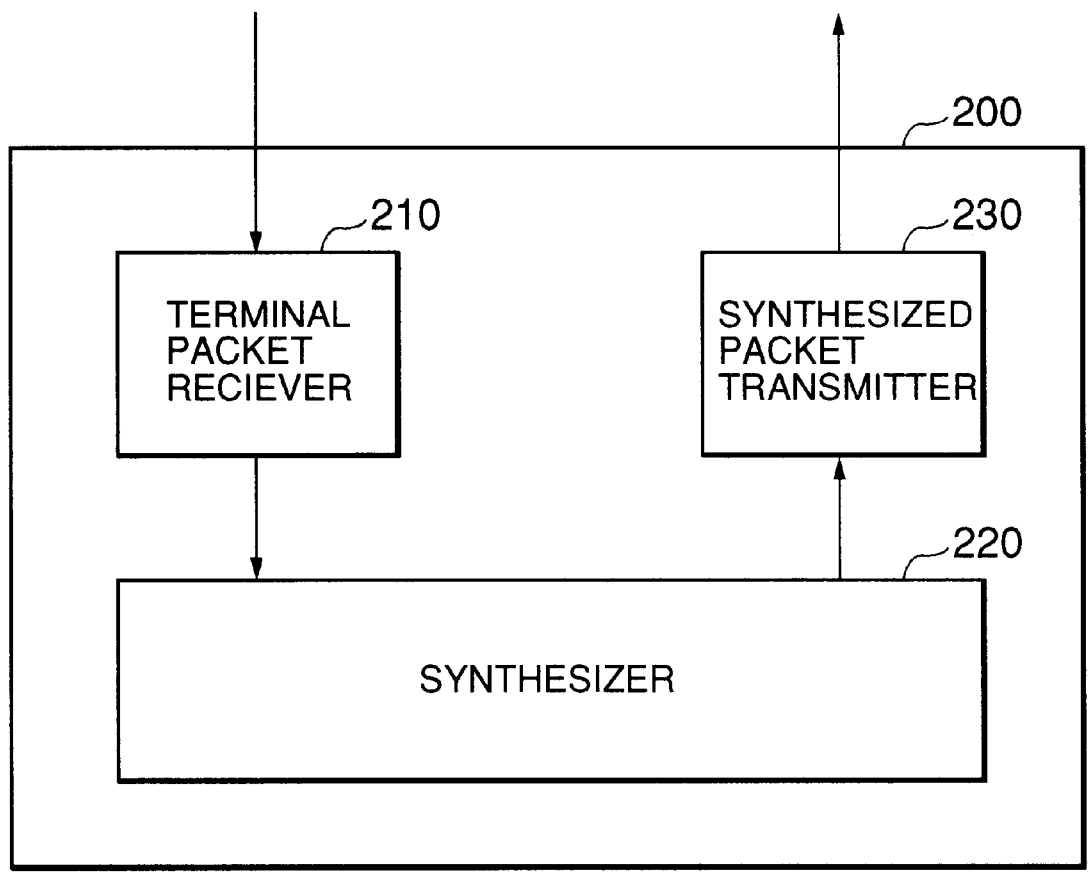
FIG. 3 is a block diagram showing a structure of a conference controller 200 in the present invention.

Referring to FIG. 3, the conference controller 200 comprises a terminal packet receiver 210, a synthesizer 220 and a synthesized packet transmitter 230.

The terminal packet receiver 210 receives the terminal packet from each of the conference terminals 100, and outputs it to the synthesizer 220.

The synthesizer 220 synthesizes the terminal packet illustrated in FIG. 4, which is sent from the terminal packet receiver 210, and generates the synthesized packet. Synthesizing processing will be described later in detail.

The synthesized packet transmitter 230 transmits the synthesized packet from the synthesizer 220 to the network 300.

Next, the synthesizing processing for the voice data performed in the present invention will be described below.

Referring to FIG. 4, the j-th voice data $DT_{ij}$ in the conference terminal i forms the terminal packet together with the identifier $ID_i$, and the serial number $SEQ_j$. Here, the voice data arrived to the conference controller 200 from the conference terminal i at a certain time $T_k$ shall be expressed as $D_{ik}$. The conference controller 200 generates the synthesized voice data $DTM_k$ in the following manner.

$$DTM_k = \sum_{i=1}^{m} D_{ik}$$

For example, assuming that at the time $T_k$, the terminal voice data $DT_{14}$ of the serial number 4 from the conference terminal 1 be received, the terminal voice data $DT_{23}$ of the serial number 3 from the conference terminal 2 be received, and the terminal voice data $DT_{33}$ of the serial number 3 form the conference terminal 3 be received, $DTM_k$ is generated according to the following formula.

$$DTM_k = D_{1k} + D_{2k} + D_{3k}$$
$$= DT_{14} + DT_{23} + DT_{33}$$

Referring to FIG. 5, the voice data $DTM_k$ synthesized in the above-described manner forms the synthesized packet together with a pair of the terminal identifier and serial number used in the synthesizing processing. This synthesized packet is transmitted to each of the conference terminals 100.

Next, echo canceling processing performed in the present invention will be described below.

For example, the voice data a, b and c are transmitted from the three conference terminals A, B and C, respectively, and they are generated as the synthesized voice data (a+b+c) by means of the conference controller 200. The synthesized data (a+b+c) is distributed to the three conference terminals A, B and C. The conference terminal A performs the subtraction processing "(a+b+c)–a" in which the voice data a is subtracted from the received synthesized voice data (a+b+c), the voice data a being transmitted by the conference terminal A. Then, the conference terminal A reproduces the voice data (b+c). The conference terminal B performs the subtraction processing "(a+b+c)–b" in which the voice data b is subtracted from the received voice data (a+b+c), the voice data b being transmitted by the conference terminal B. Then, the conference terminal B reproduces the voice data (a+c). The conference terminal C performs the subtraction processing "(a+b+c)–c" in which the voice data c is subtracted from the received voice data (a+b+c), the voice data c being transmitted by the conference terminal C. Then, the conference terminal C sounds the voice data (a+b). Thus, the echo to be caused by the voice signal of the local conference terminal can be prevented.

When the echo canceler 170 receives the synthesized packet from the synthesized packet receiver 160, the echo canceler 170 extracts the serial number corresponding to its terminal identifier from the synthesized packet. For example, in the example shown in FIG. 5, the conference terminal 100 corresponding to the terminal identifier "$ID_2$" extracts "$SEQ_3$" as the serial number.

Figure 7:
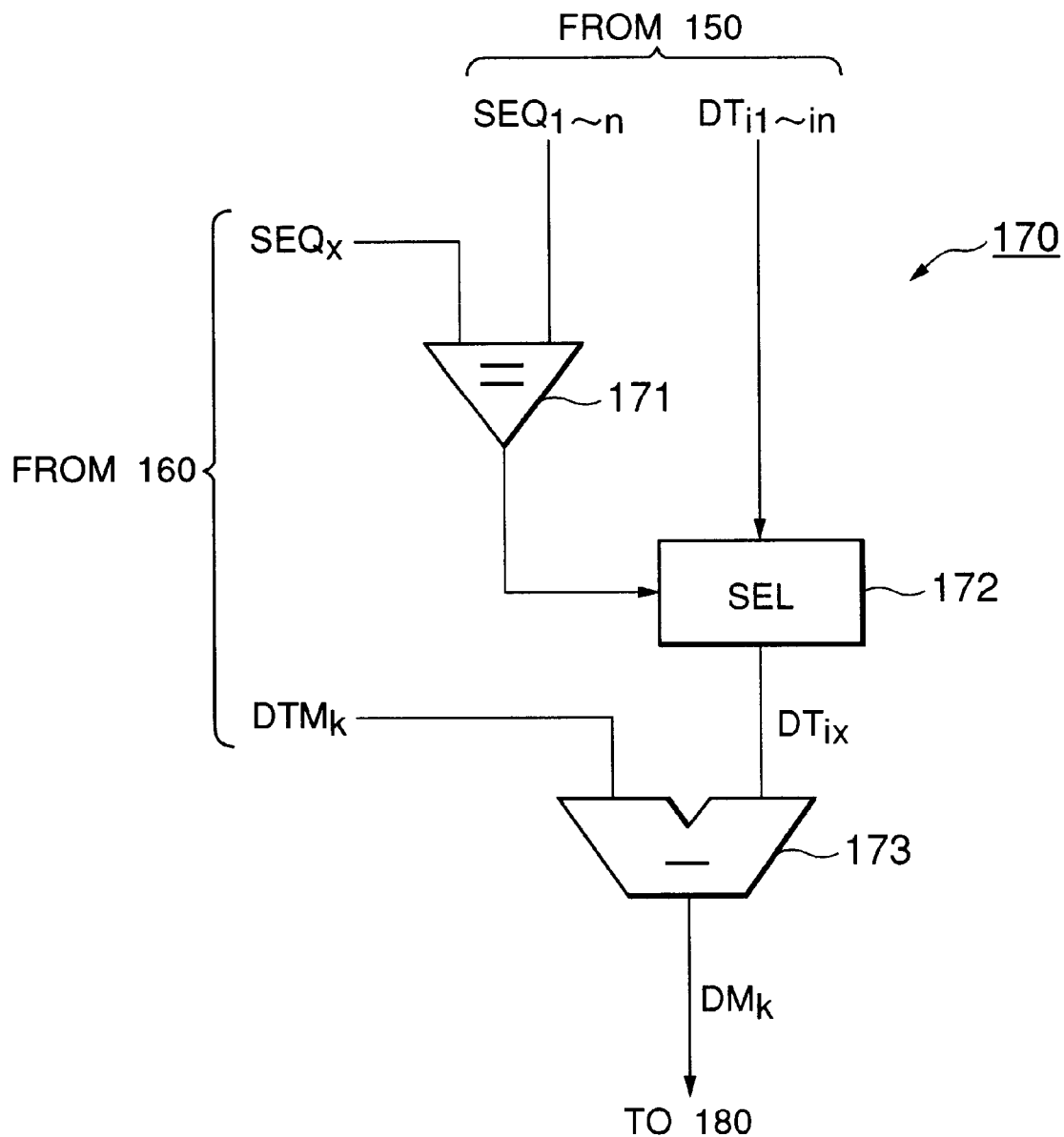
FIG. 7 is a drawing showing a configuration of an echo canceler 170.

Referring FIG. 7, the echo canceler 170 searches the terminal packet memory 150 using the serial number $SEQ_x$ which has been extracted in the above-described manner. That is, the echo canceler 170 searches an entry having the serial number $SEQ_x$ in the terminal packet memory 150 by using a comparator 171. If the entry having the serial number $SEQ_x$ is present in the terminal packet memory 150, a selector 172 selects terminal voice data $DT_{ix}$ corresponding to the serial number $SEQ_x$ of this entry. A subtractor 173 subtracts the voice terminal data $DT_{ix}$ from the synthesized voice data $DTM_k$, and outputs the voice data $DM_k$. If no entry having the serial number $SEQ_x$ is present in the terminal packet memory 150, processing for canceling the echo is unnecessary. Therefore, the selector 172 outputs "0", and the subtractor 173 outputs the synthesized voice data $DTM_k$ as the voice data $DM_k$ directly. After this voice data $DM_k$ is decoded by the decoder 180 and sounded by the speaker 190.

As is apparent from the above description, according to the present invention, since the terminal voice data by the conference terminal is stored in this conference terminal, the terminal voice data causing the echo is canceled from the synthesized voice data so that an occurrence of the echo can be prevented. Moreover, since the packet to be transmitted to each of the conference terminals is identical, higher speed processing can be achieved in the network having a multi-casting function.

While the invention has been described in terms of several preferred embodiments, those skilled in the art will recognize that the invention can be practiced with modification within the spirit and scope of the appended claims.

What is claimed is:

1. A conference terminal in a remote conference system using asynchronous transmission, said conference terminal canceling a voice data of said conference terminal from a synthesized voice data which is obtained by synthesizing voice data produced by all other conference terminals, said conference terminal comprising:

a terminal packet generator for generating a terminal packet including said voice data;

a terminal packet memory for storing the terminal packet generated by said terminal packet generator; and an echo canceler for canceling said voice data included in the terminal packet stored in said terminal packet memory from the synthesized voice data, wherein:

said terminal packet generator appends an identifier of said conference terminal and a sequential number in said conference terminal to said voice data, thereby generating the terminal packet;

the synthesized voice data forms a synthesized packet together with the identifier and the sequential number; and said echo canceler cancels said voice data included in the terminal packet stored in said terminal packet memory from the synthesized voice data included in said synthesized packet, when the synthesized packet includes the identifier of its own conference terminal and the sequential number corresponding to the terminal packet stored in said terminal packet memory.

2. The conference terminal according to claim 1, said conference terminal further comprising;

an encoder for encoding a voice signal of said conference terminal as said voice data and outputting said voice data to said terminal packet generator; and a decoder for decoding the synthesized voice data from which said voice data is canceled.

3. A remote conference system comprising:

a conference controller;

a plurality of conference terminals; and a network for connecting said conference controller and said plurality of conference terminals using asynchronous transmission, wherein each of said plurality of conference terminals comprises:

a terminal packet generator for appending an identifier of said conference terminal and a sequential number in said conference terminal to a voice data produced by said conference terminal, thereby generating the terminal packet; and a terminal packet memory for storing the terminal packet generated by said terminal packet generator, wherein said conference controller comprises a synthesizer for synthesizing voice data included in terminal packets from said plurality of conference terminals and forming a synthesized packet together with identifiers and sequential numbers of the synthesized voice data of said plurality of conference terminals, and wherein each of said plurality of conference terminals further comprises an echo canceler for canceling said voice data included in the terminal packet stored in said terminal packet memory from the synthesized voice data included in the synthesized packet from said conference terminal when the identifier of said voice data is identical to that of its own conference terminal.

4. The remote conference system according to claim 3, wherein said network performs multicasting for the synthesized packet to said plurality of conference terminals.

5. The remote conference system according to claim 3, wherein said echo canceler comprises:

a comparator for detecting a coincidence between a sequential number included in said synthesized packet and a sequential number stored in said terminal packet memory;

a selector for selecting a voice data corresponding to the sequential number detected by said comparator; and a subtractor for subtracting the voice data selected by said selector among the voice data included in said synthesized packet.

6. The remote conference system according to claim 3, wherein said conference terminal further comprises:

an encoder for encoding a voice signal of said conference terminal as said voice data and outputting said voice data to said terminal packet generator; and a decoder for decoding the synthesized voice data from which said voice data is canceled.

* * * * *